(12) United States Patent
Wild

(10) Patent No.: US 6,634,074 B2
(45) Date of Patent: Oct. 21, 2003

(54) METHOD FOR SEALING A LEAK IN A PIPE JOINT

(75) Inventor: Michael David Wild, Belper (GB)

(73) Assignee: M. W. Polymer Products Limited, Derby (GB)

(*) Notice: Subject to any disclaimer, the term of this patent is extended or adjusted under 35 U.S.C. 154(b) by 99 days.

(21) Appl. No.: 09/796,199

(22) Filed: Feb. 28, 2001

(65) Prior Publication Data
US 2003/0056370 A1 Mar. 27, 2003

(30) Foreign Application Priority Data
Mar. 1, 2000 (GB) .............................................. 0004758

(51) Int. Cl.$^7$ ................................................. B23P 6/00
(52) U.S. Cl. ............................... 29/402.18; 29/402.02; 29/402.04; 29/402.05; 29/402.06; 29/402.08; 138/97; 138/98
(58) Field of Search ...................... 29/402.02, 402.18, 29/402.04, 402.05, 402.08, 402.06; 156/94, 294; 138/97, 98

(56) References Cited

U.S. PATENT DOCUMENTS

| | | | | |
|---|---|---|---|---|
| 1,946,619 A | * | 2/1934 | Furman et al. | 264/155 |
| 2,745,231 A | * | 5/1956 | Prince | 451/36 |
| 3,507,725 A | * | 4/1970 | Hylak et al. | 156/94 |
| 3,563,823 A | | 2/1971 | Yie | |
| 4,326,735 A | * | 4/1982 | Hunder et al. | 285/15 |
| 4,582,551 A | * | 4/1986 | Parkes et al. | 156/94 |
| 4,584,963 A | * | 4/1986 | Morinaga et al. | 118/663 |
| 4,627,471 A | * | 12/1986 | Parkes et al. | 138/97 |
| 4,643,855 A | * | 2/1987 | Parkes et al. | 264/36.17 |
| 4,673,449 A | * | 6/1987 | Webb et al. | 156/94 |
| 4,731,982 A | * | 3/1988 | Grant et al. | 156/94 |
| 4,772,031 A | * | 9/1988 | Poppo | 277/316 |
| 5,046,289 A | * | 9/1991 | Bengel et al. | 451/76 |
| 5,894,864 A | * | 4/1999 | Rich | 138/99 |
| 5,913,977 A | * | 6/1999 | Nichols | 118/712 |
| 5,924,913 A | * | 7/1999 | Reimelt | 451/36 |
| 6,180,169 B1 | * | 1/2001 | Nichols | 427/236 |
| 6,244,630 B1 | * | 6/2001 | Baucom et al. | 285/15 |
| 6,385,836 B1 | * | 5/2002 | Coltrin | 29/402.18 |
| 6,446,662 B1 | * | 9/2002 | Wagner | 137/318 |
| 6,505,783 B1 | * | 1/2003 | Lazarski et al. | 239/246 |

FOREIGN PATENT DOCUMENTS

| | | |
|---|---|---|
| GB | 1546073 | 5/1979 |
| GB | 2027840 A | 2/1980 |
| GB | 2 119 058 A | 11/1983 |
| GB | 2174776 A | 11/1986 |

\* cited by examiner

Primary Examiner—Gregory Vidovich
(74) Attorney, Agent, or Firm—Adams Evans P.A.

(57) ABSTRACT

A method for repairing a leak in a pipe joint, the joint including a gasket. The method requires a passage to be formed through the wall of the first pipe. A space is then formed in the gasket communicating with the passage. After this, a sealant is injected through the passage into the space thus allowing the fluid to repair the leak.

31 Claims, 7 Drawing Sheets

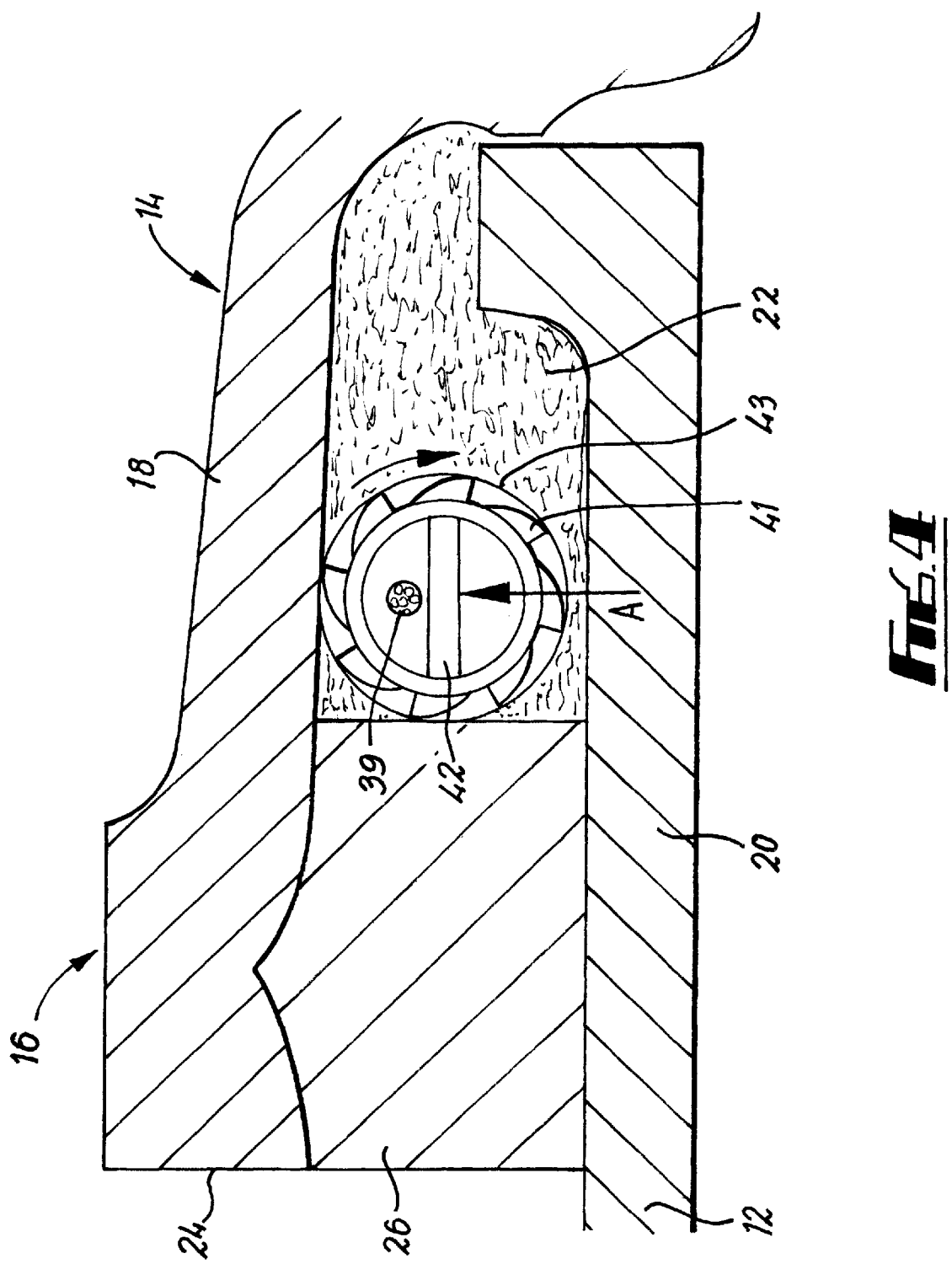

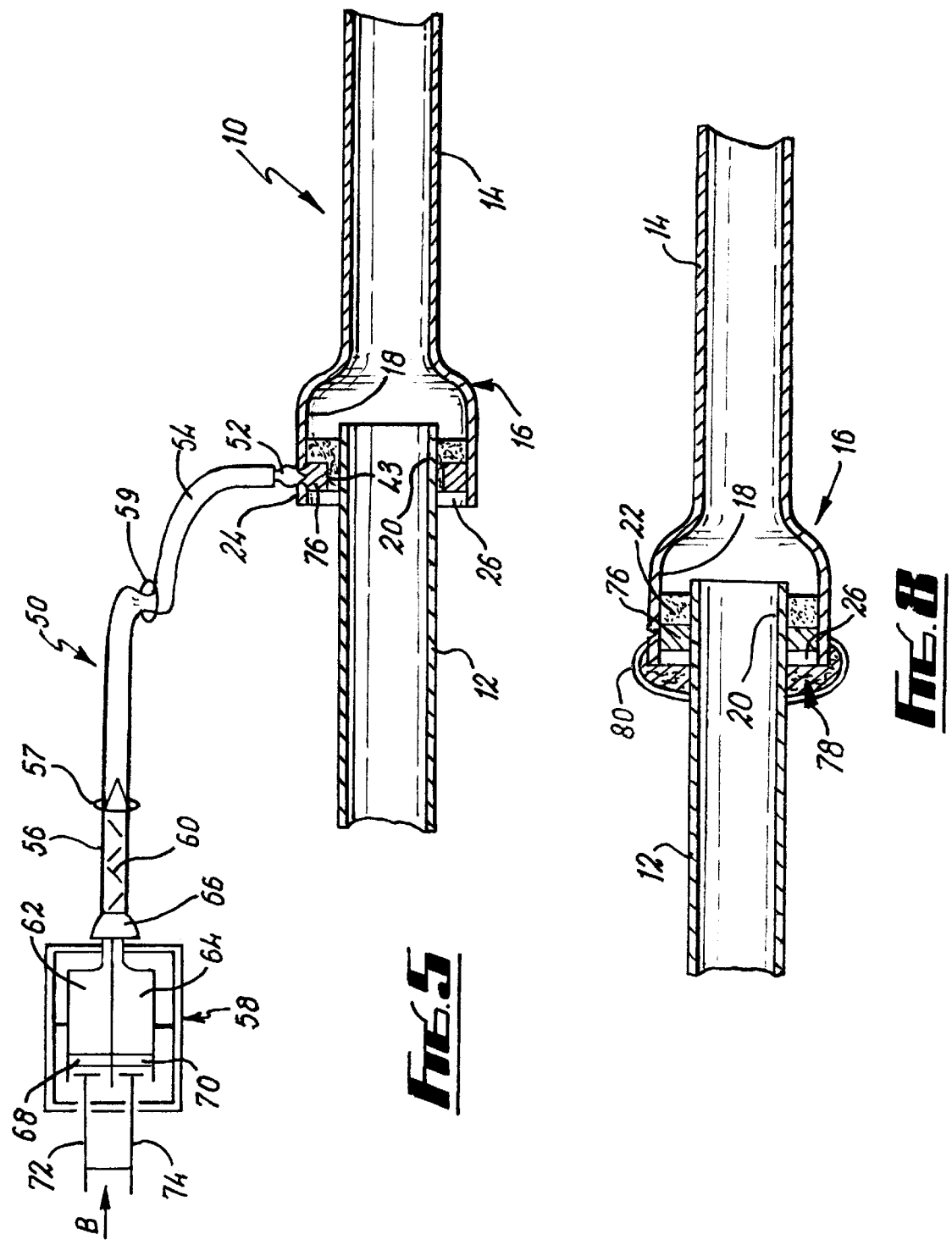

METHOD FOR SEALING A LEAK IN A PIPE JOINT

FIELD OF THE INVENTION

This invention relates to methods for sealing leaks in pipe joints.

BACKGROUND OF THE INVENTION

The most common type of joint in pipes carrying natural gas is known as a lead/yarn joint. This joint consists of a bell-shaped end region on one section of the pipe which receives into it an end region of the adjacent section of the pipe. The annular void between the end regions of the two sections is packed with a hemp material to form a gasket. Over this is provided a lead O-ring which extends between the gasket and the region external of the pipe. The lead O-ring is applied to provide mechanical strength to the seal in the joint.

The hemp used as a gasket contains about 75% to 80% water which gradually evaporates therefrom. This causes the gasket to shrink and decay. In addition, movement of the ground causes the lead O-ring to distort. This results in the escape of gas.

In view of the fact that much of this piping was laid at the turn of the Century, many of the gaskets in the pipe sections have decayed to allow gas to escape.

Several methods are used in order to seal leaking pipes. One method involves the application of a steel mould around the joint into which a curable resin is injected and allowed to set. Unfortunately, a disadvantage of such systems is that the steel moulds are expensive, and it is often difficult to remove them after the leak has been repaired.

Another method involves attaching an elongate member of C-shaped profile around the leaking joint, such that the member extends from one pipe section to the other. The member is provided with a socket to allow the escape of gas, and is secured to the pipe sections at the joint by means of resin or other suitable material. A plug is screwed into the socket to seal the leak. Unfortunately, the efficiency cannot be guaranteed, because ground movement can often cause the repair to fail.

A third method involves the injection of an acrylic material into the gasket. This requires complete saturation of the gasket in order for the seal to be effective. Unfortunately, the complete saturation of the gasket cannot be guaranteed and the repairs are often ineffective.

SUMMARY OF THE INVENTION

According to a first aspect of this invention there is provided a method for repairing a leak in a pipe joint between first and second pipes having a gasket at said joint, the method comprising forming a passage through the wall of the first pipe, forming a space in said gasket communicating with said passage, and thereafter injecting a sealant into said space via said passage, whereby the fluid can repair the leak The passage may be formed by drilling. In one embodiment the aperture may be formed at an angle between tangential and perpendicular to the pipe wall. Preferably, the angle is between 20° and 70° to a line perpendicular to the pipe wall, more preferably between 30° and 60° to said line.

The step of forming the space in the gasket may include forming a second passage which may extend substantially circumferentially around the gasket. The first and second passages may be formed to extend to a region beyond said leak, preferably substantially wholly around the pipe.

In one embodiment, the step of forming said space in the gasket may further include inserting a space forming member into the pipe, preferably via said first passage, and applying a force thereto. The force may be a rotational force applied transverse to the intended direction of movement of the space forming member into the seal.

The space forming member may comprise an end piece, adapted to drill into said gasket, and elongate drive means extending from the end piece, whereby rotation of the drive means can cause rotation of the end piece, thereby causing the end piece to drill into said gasket. The end piece may be a drill bit which may be helical in configuration. The drive means may be a flexible member, for example a flexible cable.

In one embodiment, the flexible cable may be arranged within a tubular member. An urging means may act to urge the cable towards on of the walls of the pipe sections, preferably an outer wall. The urging means is preferably elongate and may extend from one end region to the other end region of the tubular member. Preferably, the urging means is fixed at said one end region of the tubular member adjacent the end piece.

The urging means may be in the form of a flexible tape, suitably formed of a material more rigid than the drive means or the tubular member, for example, steel. The urging means may be adapted to push on the cable in a direction transverse to the direction of motion thereof as the cable passes through the gasket.

Preferably, the second passage is so formed that rotation of the end piece causes said end piece to move around the periphery of the gasket. The end piece may be so shaped the rotation thereof causes it to move in a desired direction, suitably towards the adjacent end of the pipe section.

Where the pipe joint includes an end member adjacent the gasket, the step of forming said pathway may include forming said pathway adjacent the end member, preferably between said end member and the gasket. The end member may be an O-ring.

In another embodiment, the step of forming said pathway may include injecting a solution into the first pipe, the solution being suitable for dissolving at least some of said gasket. The solution may comprise an organic solution capable of dissolving at least some of the gasket. The organic solution may be selected from a solution of micro-organisms, a solution of exacted enzyme powders, and a solution comprising a mixture of micro-organisms and extracted enzyme powders. The micro-organisms are advantageously capable of dissolving at least some of the gasket by digesting at least some of the gasket. The micro-organisms may be selected from one or more of cellulase, hemicellulase, drielase and other suitable micro-organisms.

Means may also be provided for deactivating the above-mentioned solution to halt the dissolving of the gasket. Said controlling means may comprise a deactivating solution to deactivate said solution. The deactivating solution may comprise one or more acids, one or more alkalis and/or one or more chemical inhibitors adapted to disable micro-organisms.

Means for directing sealant flow may also be provided. Said directing means may be adapted to direct said first mentioned solution before the sealant is injected, whereby the first mentioned solution is directed to form a path in a desired direction. Alternatively, the directing means may be adapted to direct the sealant.

Where the directing means is adapted to direct the first mentioned solution, the directing means may comprise magnetic means. In one embodiments the magnetic means may apply a magnetic field, whereby the micro-organisms can align themselves with said magnetic field to be directed in a desired direction preferably to form a path.

Where the directing means is to be applied to the sealant, the directing means may include a magnetic material in the sealant, said material being capable of being acted on by a magnetic field by said magnetic means.

The injection of said sealant may be by injection means, for example a static mixer and a syringe. The sealant may comprise a first component comprising a curable sealing material, and a second component comprising a curing agent. The components may be injected through the mixer to the pipe via said aperture.

At least one of the first or second components may be adapted such that the sealant cures after a pre-selected period has elapsed. This has the advantage in the preferred embodiment of eliminating or mitigating the reliance upon internal pipe conditions assisting the cure. This also provides the advantage in the preferred embodiment that the delay allows time for the injected sealant to flow to the leak.

Materials suitable for use as sealants are two part thermosetting methacrylate materials.

According to a second aspect of this invention, there is provided a method for sealing a pipe, comprising applying sealing means externally of the pipe across the joint. The sealing means may be in the form of a putty, for example a polyurethane putty. The sealing means may comprise a first component in the form of a curable material, and a second component comprising a curing agent.

The sealing means may be applied around the pipe.

After said sealing means has been applied to the pipe, compression means may be applied over the sealant to compress the sealing means. The compressing means may be in the form of a plastic film, which may be applied under tension to the pipe. The plastic film may be adapted to change colour when appropriate tension has been applied thereto. Desirably the film may change from clear to white when the appropriate tension has been applied.

An example of a suitable sealant is one sold under the trade mark POLYFORM by M W Polymers Limited. An example of a film which can be used is one sold by M W Polymer Products Limited under the trade mark POLYFORM wrapping film.

This second aspect of the invention may be provided as a secondary seal after the above first mentioned aspect has been carried out.

BRIEF DESCRIPTION OF THE DRAWINGS

Embodiments of the invention will now be described by way of example only, with reference to the accompanying drawings, in which:

FIG. 4 is a diagrammatic section view of part of a pipe joint showing the space forming member of FIG. 3 in use;

FIG. 5 is a cross-sectional side view of the pipe shown in FIG. 1, showing means for injecting a sealant into the joint;

FIG. 8 is a cross-sectional side view of the pipe shown in FIGS. 1 and 4, showing an external seal applied thereto.

DETAILED DESCRIPTION OF THE INVENTION

Figure 1:
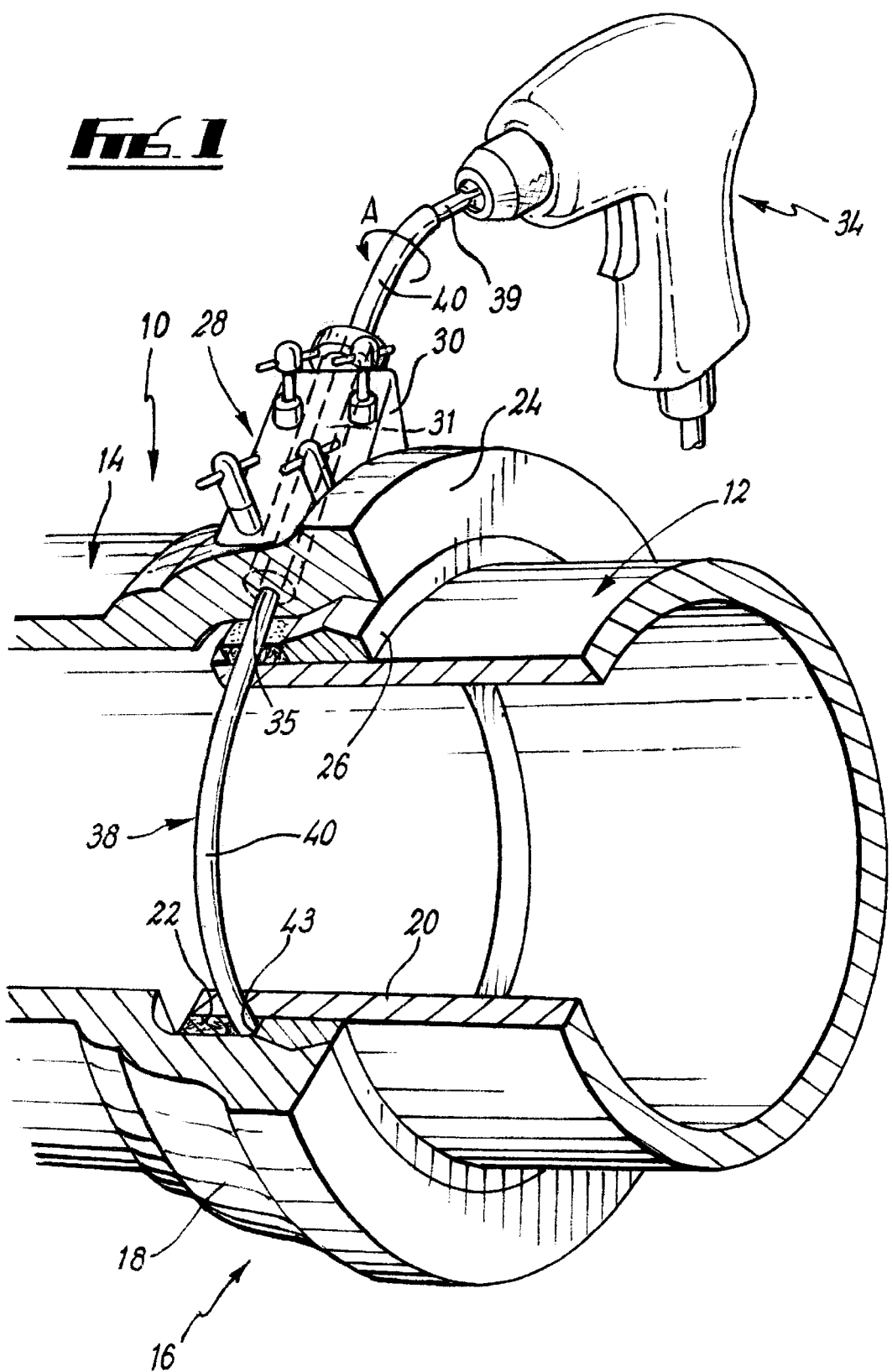
FIG. 1 is a perspective sectional view of a joint in the pipe showing means for forming a space in the joint.

Referring to the drawings, a pipe 10 comprises first and second pipe sections 12, 14. A joint 16 connects the two pipe sections 12, 14. The joint 16 is provided by a bell-shaped end region 18 of the pipe section 14 which is of larger inner diameter than the outer diameter of an end region 20 of the pipe section 12, so that the end region 20 is received within the end region 18. An annular gasket 22 is provided between the bell-shaped end region 18 of the pipe section 14 and the end region 20 of the pipe section 12. The gasket 22 is of an annular configuration, and can be formed of hemp. At the outer end 24 of the bell-shaped region 18 there is provided a lead O-ring 26. This construction of pipe joint is common in many pipes.

The hemp forming the gasket 22 is prone to decay over time. Moreover, ground movement can distort the lead O-ring 26. Consequently, the joints can leak.

Figure 2:
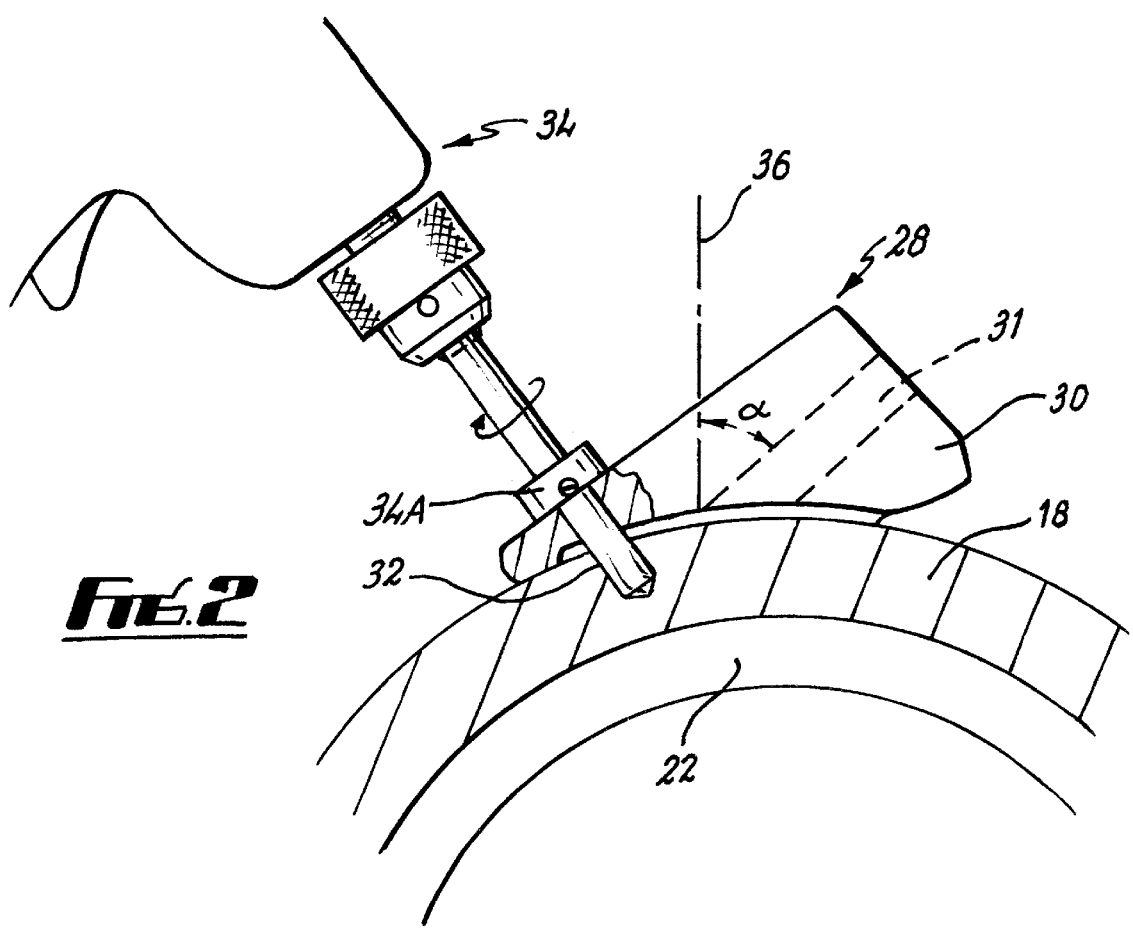
FIG. 2 is a sectional side view showing part of a pipe joint with a drill guide being secured thereto.

A preferred embodiment of the present invention for repairing such leaks involves attaching around the bell-shaped end region 18 a drill guide 28. FIG. 2 shows how the drill guide 28 is secured to the end region 18. The drill guide 28 comprises a holding member 30 defining a through guide aperture 31 through which a space forming member can extend, as explained below. The drill guide 28 comprises four through holes 32 extending through the holding member 30 transverse to the guide aperture 31. The through holes 32 receive fastening means in the form of bolts 33 which are screwed into holes drilled into the pipe by a drill 34.

Figure 2A:
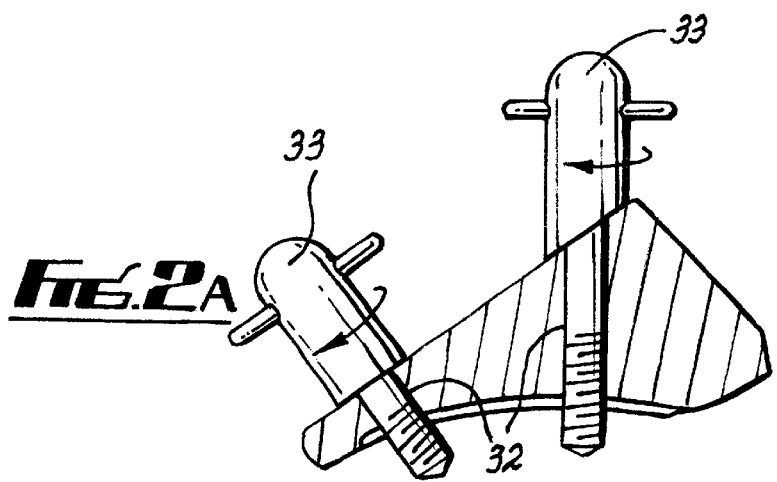
FIG. 2A shows the drill guide with fastening means extending therethrough to fasten the drill holder to the pipe.

The holding member 30 is arranged on the region 18 of the pipe section 18 and the through holes 32 are used as guides for drilling into the circumferentially extending region of the wall of the pipe section 14. A collar 34A restricts the depth to which the holes are drilled in the pipe wall. Four such holes are drilled, each corresponding to a respective one of the through holes 32. Bolts 33 are then inserted through the holes 32 and screwed into the pipe wall (see FIG. 2A).

As can be seen, the through aperture 31 extends at an angle ∝ to an imaginary line designated 36, the line 36 being perpendicular to the wall of the end region 18 of the pipe 14. The angle ∝ is preferably between 30° and 60°.

When the drill guide 28 has been attached around the end region 18 of the pipe 16, a drill is inserted to drill an aperture 35 through the wall of the end region 18 which, as can be seen from FIG. 1, is at the same angle as the guide aperture 34. The aperture 35 is drilled through the circumferentially extending region of the pipe wall to the gasket 22 inside.

After the drilling is completed, a space forming member 38 is inserted through the aperture 31 and the aperture 35 drilled in the wall of the pipe at the end region 18.

Figure 3:
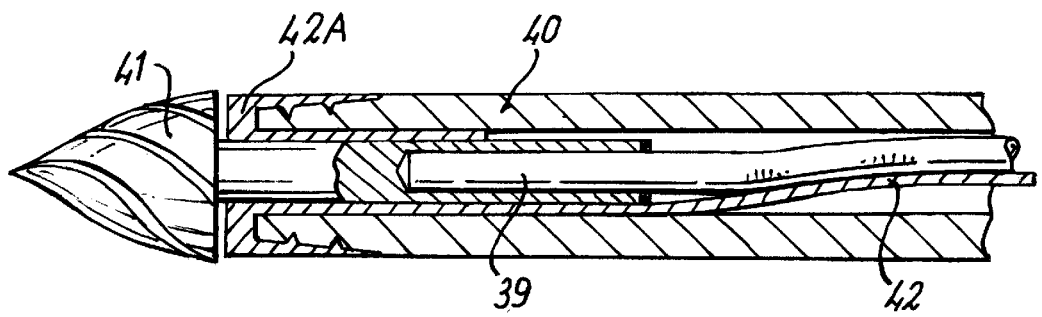
FIG. 3 is a sectional side view of a space forming member.
Figure 3A:
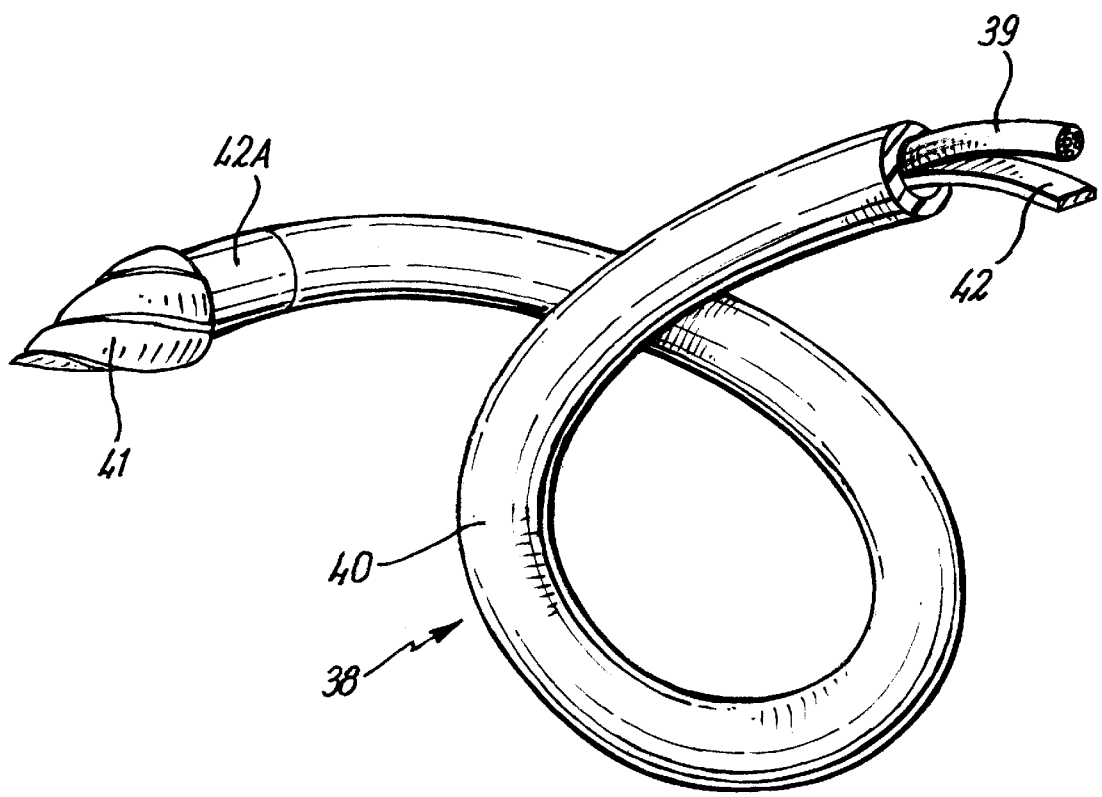
FIG. 3A is an external view of the space forming member of FIG. 3.

Referring to FIGS. 3 and 3A, the space forming member 38 comprises elongate drive means in the form of a flexible cable 39, an elongate tubular member of casing 40 through which the cable 39 extends and a helical drill bit 41. An urging means in the form of an elongate steel tape 42 also extends through the tubular casing 40. The drill bit 41 is fixedly attached to the flexible cable 39 at one end thereof. The drill bit 41 and the cable 39 can rotate about the cable 39. The steel tape 42 is fixedly attached to a ferrule 42A which in turn is fixedly attached to the end of the casing 40 adjacent the drill bit 41. The steel tape 42 acts to guide the cable 39 and the drill bit 41 around the inside of the pipe joint and prevents the drill bit 41 deviating from its path. The steel tape 42 exerts a force as indicated by the arrow A on the cable 39 to push the cable 39 against the outer wall of the pipe joint and against the O-ring. Thus a path can be formed in the gasket 22 around the inside of the gas pipe joint.

By rotating the cable 39 about its longitudinal axis, as indicated by the arrow A the drill bit 41 is rotated. This rotation of the drill bit 41 by the drill 34 causes the drill bit 41 to drill into the gasket 22 thereby creating a path 43 therethrough (see FIG. 1). This is continued until the drill bit 41 reaches the site of the leak. In such a situation, the positioning of the drill holder 28 on the end region 18 has to be such to ensure that the path forming member 38 reaches the site of the leak.

Alternatively, the position of the drill holder 28, and the shape and size of the drill bit 41 are selected such that upon rotation of the cable 39, the drill bit 41 drills through the gasket 22 against the lead O-ring 26. The drill bit 42 creates a path between the O-ring 26 and the remainder of the gasket 22 until it has drilled all the way around the end region 18. Thus, in this embodiment, an annular path 43 is defined all the way around the gasket 22 adjacent the lead O-ring.

When the path 43 has been formed by the space forming member 38 either to the site of the leak or substantially wholly around the end of the pipe section 14, the path joining member is removed by, for example, rotating it in the opposite direction and puling it out of the pipe section 14.

The next step of the method for repairing the leak is shown in FIG. 5, in which injection means 50 is provided to inject a sealant via the aperture dulled in the wall of the end region 18 and into the path defined by the path forming member 38.

The injection means 50 comprises a nozzle 52 inserted into the aperture 35 drilled into the wall of the pipe 14 at the end region 18. The nozzle 52 is connected to a length of piping 54 which, at its opposite end is connected to a static mixer 56 by a clip 57. The static mixer 56 is adapted to receive the two components of a sealant from an injection gun 58. Prior to injection, the piping 54 is crimped by a clip 59 to prevent leakage of gas along the piping 54.

The static mixer 56 comprises an array of alternating left and right-hand helices 60 arranged at 90° to one another and extending lengthwise of the mixer 56. The injection gun 58 comprises first and second compartments 62, 64, the compartment 62 being adapted to receive a sealing material, and the compartment 64 being adapted to receive a curing agent to cure the sealing material. The injection gun 58 is attached to the static mixer 56 via a retaining nut 66. Pistons 68, 70 are arranged respectively in the compartments 62, 64, and the pistons 68, 70 are acted on by respective plungers 72, 74 which are connected together.

In order to inject the sealant, the clip 57 is removed and the plungers 72, 74 are pushed in the direction indicated by the arrow B. This moves the pistons 68, 70 in the same direction and pushes the materials in the compartments 62, 64 through the static mixer thereby ensuring full mixing of the materials. The mixture then passes down the piping 54, and enters the path 43 defined by the space forming member 38 via the aperture 35. The mixture then passes around the path 43 either to the site 44 of the leak to seal the site on curing. Alternatively, as shown in FIG. 2, if the path 43 extends wholly around the gasket 22 the mixture will also extend wholly therearound to form an annular seal adjacent the lead O-ring, on curing As can be seen from FIG. 2, the cured sealant forms an annular seal 76 adjacent the pipe wall and the lead O-ring 26. This would be suitable for sealing a leak at a site adjacent the side wall and the lead O-ring 26. However, if desired, the annular seal 76 could extend between the side wall of the pipe section 14 and the side wall of the pipe section 12. For an example of such a seal, see FIG. 3.

Materials suitable for use as sealants are two part thermosetting methacrylate materials.

In an alternative embodiment, the use of the space forming member 38, as described above, is replaced by the injection of a gasket dissolving solution capable of dissolving, for example by digesting, the hemp material forming the gasket. The gasket dissolving solution may comprise exacted enzyme powders and/or micro-organisms. The micro-organisms can be one or more of cellulase, hemicellulase and drielase. An example of such a solution consists of cellulose at a concentration of substantially 2 g/dm$^3$, hemicellulase at a concentration of substantially 4 g/dm$^3$ and driselase at a concentration of 2 g/dm$^3$, prepared using distilled water. On the injection of the gasket dissolving solution through the aperture in the wall of the pipe 14, the hemp material formed in the gasket is dissolved or digested. The means for injecting the gasket dissolving solution may be the same as that shown in FIG. 5, and described above for injecting he sealant, but differing in that the static mixer 56 and the double barrelled injection gear 58 are hot required, these being replaced by a suitable single barrelled injector (not shown).

In order to control the gasket dissolving solution, magnetic means can be employed to apply a magnetic field around the end region 18 of the pipe 14 (see below). The micro-organisms align themselves with the magnetic field and thereby can be directed to desired regions in the gasket thereby creating a path for the injection of sealing fluid, as described above. It will be appreciated that, since the direction of flow of the gasket dissolving solution is controlled by the use of magnetism, the age at which the hole is drilled into the wall of the pipe 14 at the end region 18 is of less significance than in the embodiment described above using the space forming member 38.

Means are also provided to deactivate the gasket dissolving solution when the desired region of the gasket has been digested to form the pathway. This is done by flushing an appropriate deactivating solution into the gasket via the aperture in the pipe wall to deactivate the micro-organisms. An example of such a deactivating solution is a solution of acids, alkalis and chemical inhibitors.

When the above step has been completed, the step of injecting the sealant, as described above, can then be carried out.

It may also be necessary, in some embodiments, to direct the flow of the sealant through the path 43 formed either by the space fog member 38, or by the micro-organisms. This can be done by incorporating a magnetic attracting material into the sealant and thereby applying a magnetic field around the end region 18 of the pipe 14.

Figure 6:
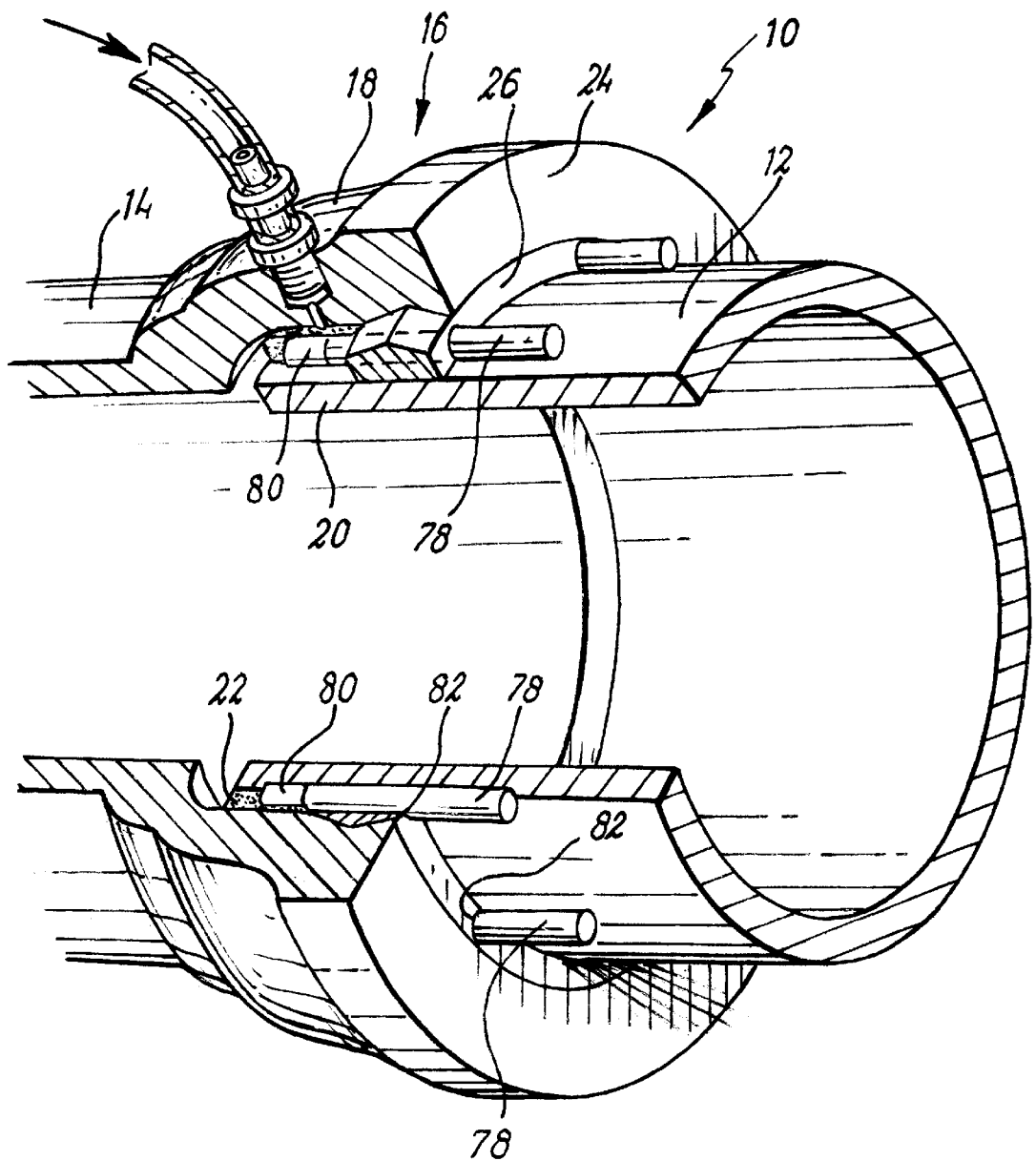
FIG. 6 is a perspective sectional view of a pipe joint showing magnetic means arranged around the joint.
Figure 7:
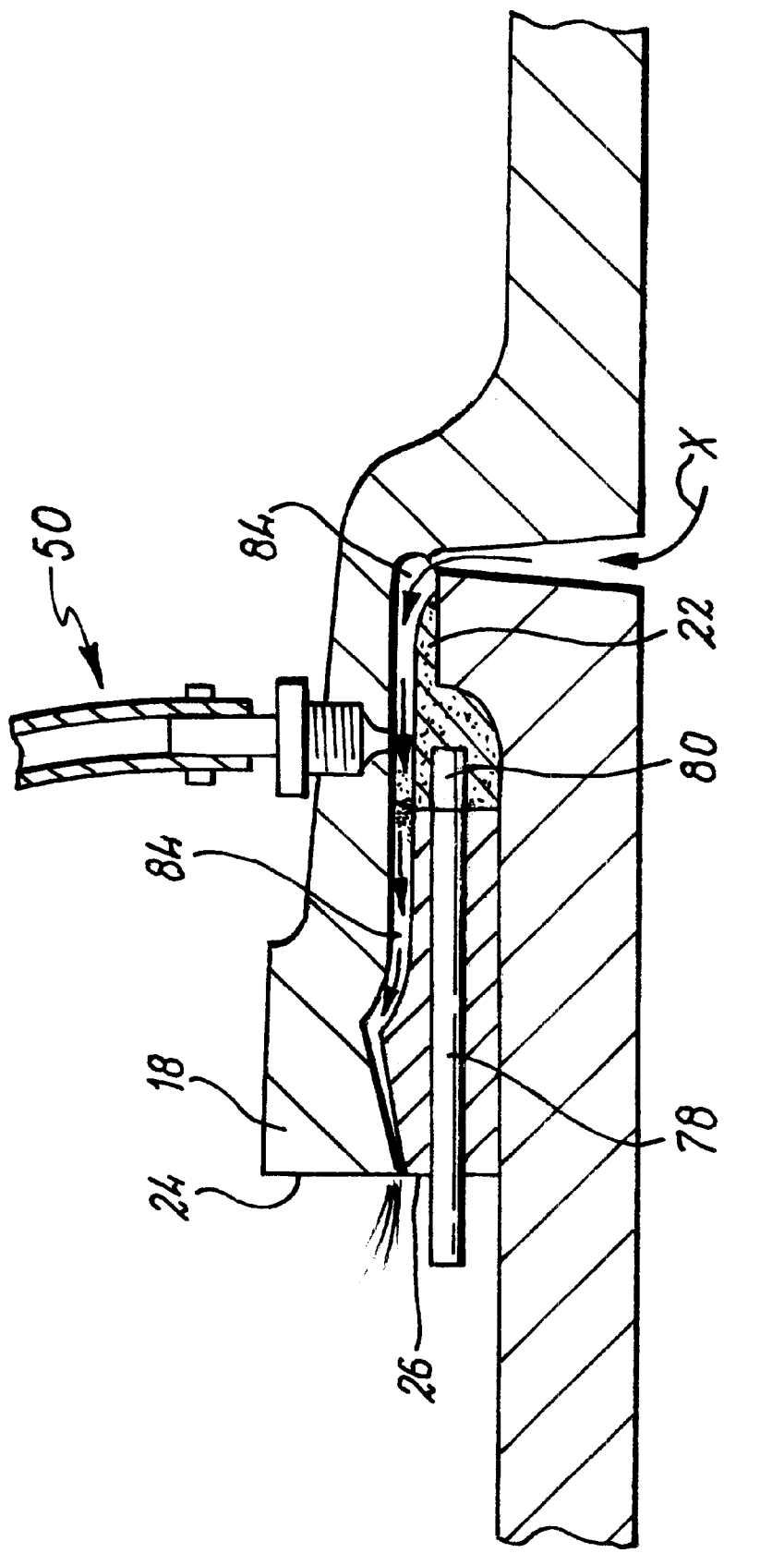
FIG. 7 is a sectional view of part of the joint shown in FIG. 6 showing the injection of a fluid.

Referring to FIGS. 6 and 7, there is shown magnetic means for controlling the flow of the gasket dissolving solution or the sealant. The magnetic means comprises a plurality of rods 78 each having magnetic tips 80 at one end thereof. A plurality of holes 82 are drilled around the joint 16 such that each hole 82 extends through the O-ring 26 into the gasket 22. The rods 78 are inserted into the holes 82 such that the tips 80 are inserted first. A magnetic field is thereby created in the gasket 22. The magnetic field attracts either the gasket dissolving solution or the sealant, or both depending on the embodiment being used.

In the embodiment shown in FIGS. 6 and 7 a gasket dissolving solution is being injected. A leak 84 has formed around the gasket 22 and between the O-ring 26 and the wall of the end section 18. Gas is leaking as shown by the arrows X.

Injection means 50, which may or may not be mounted on the pipe adjacent the leak 84 injects the gasket dissolving solution. The magnetic tips 80 of the rods 78 create a magnetic field which attracts the micro-organisms in the gasket dissolving solution which causes the micro-organisms to digest the hemp forming the gasket 22 thereby creating a path through the gasket 22 either substantially wholly around the inside of the joint 16 or to the leak 84.

When this path has been created a deactivating solution can be injected to deactivate the micro-organisms. Thereafter a sealant containing a magnetic material can be injected as described with reference to FIG. 5. The magnetic field created by the tips 80 of the rods 78 attracts the sealant material ensuring it is directed along the path so formed to form the seal.

Referring to FIG. 3, when the seal 76 has been formed, either after the space forming member 38 has been used or after the seal dissolving solution has been used, it may then be necessary to form an external seal 78 between the end region 18 of the pipe section 14 and the end region 20 of the pipe section 12. Such an external seal 78 is formed by the use of a putty material. First the surfaces of the end regions 18, 20 of the two pipe sections 12, 14 on which the putty material is to be applied are cleaned and abraded to remove dirt and paint from the pipe so that the metal is exposed. The putty is a two component mixture comprising a sealant and a curing agent, and a suitable such putty is sold by M W Polymers Limited under the trade mark POLYFORM. The two components are mixed together and the putty material is then applied to the pipe 10 around the joint 16 such that the putty material extends between the pipe section 12 and the end region 18 of the pipe section 14.

Compression means in the form of a tape 80 is then applied over the putty material and tensioned to ensure that the putty material is maintained under pressure. A preferred embodiment of the tape 80 is an aromatic polyester PUR clear film, for example, being substantially 25 $\mu$m thick. This tape has a tensile strength of 47N/mm$^2$ and a yield strength of approximately 32 m$^2$/kg; such tape has the advantage of changing colour from clear to white when the correct tension is applied. These properties have the effect that when put under tension by hand, the film approaches 100% of its modulus of elasticity which causes the colour change from clear to white. The tape 80 is wrapped around the joint 16 between the pipe sections 12, 14 under tension to compress the putty material. On curing the cured putty and the tape form the seal 78.

Various modifications can be made without departing from the scope of the invention. For example, different suitable materials can be used. In addition, the above described methods are suitable for use with pipes carrying, for example, natural gas. It may also be used for pipes carrying different products, for example water or chemicals. In the case of pipes carrying water, the sealant would need to be insoluble to water, and in other cases, the sealants would need to be resistant to the chemicals and, in many cases resistant to heat.

In the case of high temperature products in the pipe, the sealants preferably comprise alginates. More preferably the sealants would include alginates and gelatine.

The application of a secondary seal, as described in the second aspect of the invention may also be provided in the case of pipes carrying other than natural gas. In such cases, the sealant for applying the eternal seal may be selected from one or more of hydroxypropylmethylcellulose (HPMC), polystyrene, and cellulose diacetate.

In the case of HPMC, the sealant may be prepared by partially dissolving the HPMC in water. Such partial solution is in the form of a putty-like material which can be applied around a pipe joint. When the solvent evaporates, the HPMC may be precipitated as hard resinous material. A binder may be used around the partially dissolved HPMC when applied to the pipe, for example a hemp binder may be so applied.

Alternatively, the partially dissolved HPMC could be initially applied to the surface of the binder which can then be applied to the pipe such that the HPMC covers the pipe joint.

The advantage of the use of HPMC in the above embodiment is that it is partially dissolved in water which renders it non-hazardous. However, HPMC is not so resistant to high temperatures as polystyrene or cellulose diacetate. Moreover, the fact that it is at least partially soluble in water means that it is not very effective at sealing water pipes. In the case of high temperatures and/or water pipes, polystyrene and/or cellulose diacetate may be used as the secondary sealant.

In the case of polystyrene and cellulose diacetate, the solvent may be acetone.

The final resins produced by the sealant in these embodiments have the advantage of being hard without being brittle. In addition, they can withstand high pressures and the pressure which the resin can stand is proportional to the thickness of the resin.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphases has been placed thereon.

What is claimed is:

1. A method for repairing a leak in a pipe joint between first and second pipes having a gasket at said joint, the method comprising forming a first passage through the wall of the first pipe, forming a second passage in said gasket to extend substantially circumferentially around said gasket and communicating with said first passage, and thereafter injecting a sealant into said second passage via said first passage, whereby the sealant can repair the leak.

2. A method according to claim 1 wherein the first pipe has an end portion to receive and surround an end region of the second pipe, and the method includes forming said first passage through said end portion.

3. A method according to claim 1 wherein the step of forming the first passage includes forming the first passage in a circumferentially extending region of the wall of the first pipe.

4. A method according to claim 1 wherein the first passage is formed at an angle between tangential and perpendicular to the pipe wall.

5. A method according to claim 4 wherein the angle is between 20° and 70° to a line perpendicular to the pipe wall.

6. A method according to claim 5 where the angle is between 30° and 60° to a line perpendicular to the pipe wall.

7. A method according to claim 1 wherein a space forming member is inserted into the first pipe via said first passage.

8. A method according to claim 7 wherein a rotational force is applied to said space forming member to drive the space forming member into the gasket to form said second passage, the rotational force being applied transverse to the direction of movement of the space forming member into the gasket.

9. A method according to claim 8 wherein the space forming member comprises an end piece, an elongate drive means extending from the end piece, whereby rotation of the drive means can cause rotation of the end piece, thereby causing the end piece to drill into said gasket.

10. A method according to claim 9 wherein the end piece is a drill bit and the drive means is a flexible elongate member.

11. A method according to claim 10 wherein there is provided a tubular member within which the flexible member is arranged and urging means is provided to urge the flexible member towards one of the walls of pipe sections.

12. A method according to claim 11 wherein the urging means is elongate and extends from one end region to the other end region of the tubular member, the urging means being fixed and said one end region of the tubular member adjacent the end piece.

13. A method according to claim 12 wherein the urging means is in the form of a flexible tape, formed of a material more rigid than the drive means or the tubular member, the urging means being adapted to push on the flexible elongate member in a direction transverse to the direction of motion thereof as the flexible elongate member passes through the gasket.

14. A method according to claim 1 wherein the second passage is so formed that rotation of the end piece causes said end piece to move around the periphery of the seal, the end piece being shaped that rotation thereof causes it to move towards the adjacent end of the pipe section.

15. A method according to claim 1 wherein a solution is provided, and the step of forming said second passage includes injecting the solution into the pipe via said first passage, the solution being suitable for dissolving at least some of said gasket.

16. A method according to claim 15 wherein the gasket dissolving solution comprises an organic solution selected from a solution of micro organisms, a solution of extracted enzyme powders, and a solution comprising a mixture of micro organisms and extracted enzyme powders.

17. A method according to claim 16 wherein the micro organisms are selected from one or more of cellulase, hemicellulase, drielase and other suitable micro organisms.

18. A method according to claim 16 wherein means are provided for deactivating the organic solution to halt the dissolving of the gasket.

19. A method according to claim 18 wherein the deactivating means comprises a deactivating solution comprising one or more acids, one or more alkalis and/or one or more chemical inhibitors adapted to disable micro organisms.

20. A method according to claim 17 wherein means for directing solution flow is provided, said solution directing means being adapted to direct said gasket dissolving solution before the sealant is injected, whereby the gasket dissolving solution is directed to form a path in a desired direction.

21. A method according to claim 20 wherein the solution directing means comprises magnetic means to apply a magnetic field, whereby the micro organisms align themselves with said magnetic fields to be directed in a desired direction.

22. A method according to claim 20 wherein the compression means is in the form of a plastic film applied under tension to the pipe, the film being adapted to change from clear to white when appropriate tension has been applied thereto.

23. A method according to claim 1 wherein sealant directing means is provided to direct the sealant to a persecuted region of the pipe.

24. A method according to claim 23 wherein the sealant includes a magnetic material and the sealant directing means comprises magnetic means, whereby the magnetic means can interact magnetically with the magnetic material to direct the sealant.

25. A method according to claim 23, wherein said sealant directing means comprises means for directing solution flow.

26. A method according to claim 1 wherein the injection of said sealant is by injection means comprising an injector and a mixer, the sealant comprising a first component comprising a curable sealing material, and a second component comprising a curing agent.

27. A method according to claim 26 wherein at least one of the first and second components is adapted such that the sealant cures after a preselected period has elapsed.

28. A method according to claim 1 wherein a further sealing means is applied externally of the pipe across the joint.

29. A method according to claim 28 wherein the further sealing means is in the form of a putty.

30. A method according to claim 28 wherein the sealing means comprises a first component comprising a curable sealing material and a second component comprising a curing agent.

31. A method according to claim 28 wherein after said further sealing means has been applied externally of the pipe, compressor means is applied over said further sealing means to compress said further sealing means.

* * * * *